Nov. 8, 1927.
F. S. SHIELDS
1,648,366
TRACTOR HITCH FOR PLOWS
Filed June 23, 1924    4 Sheets-Sheet 1
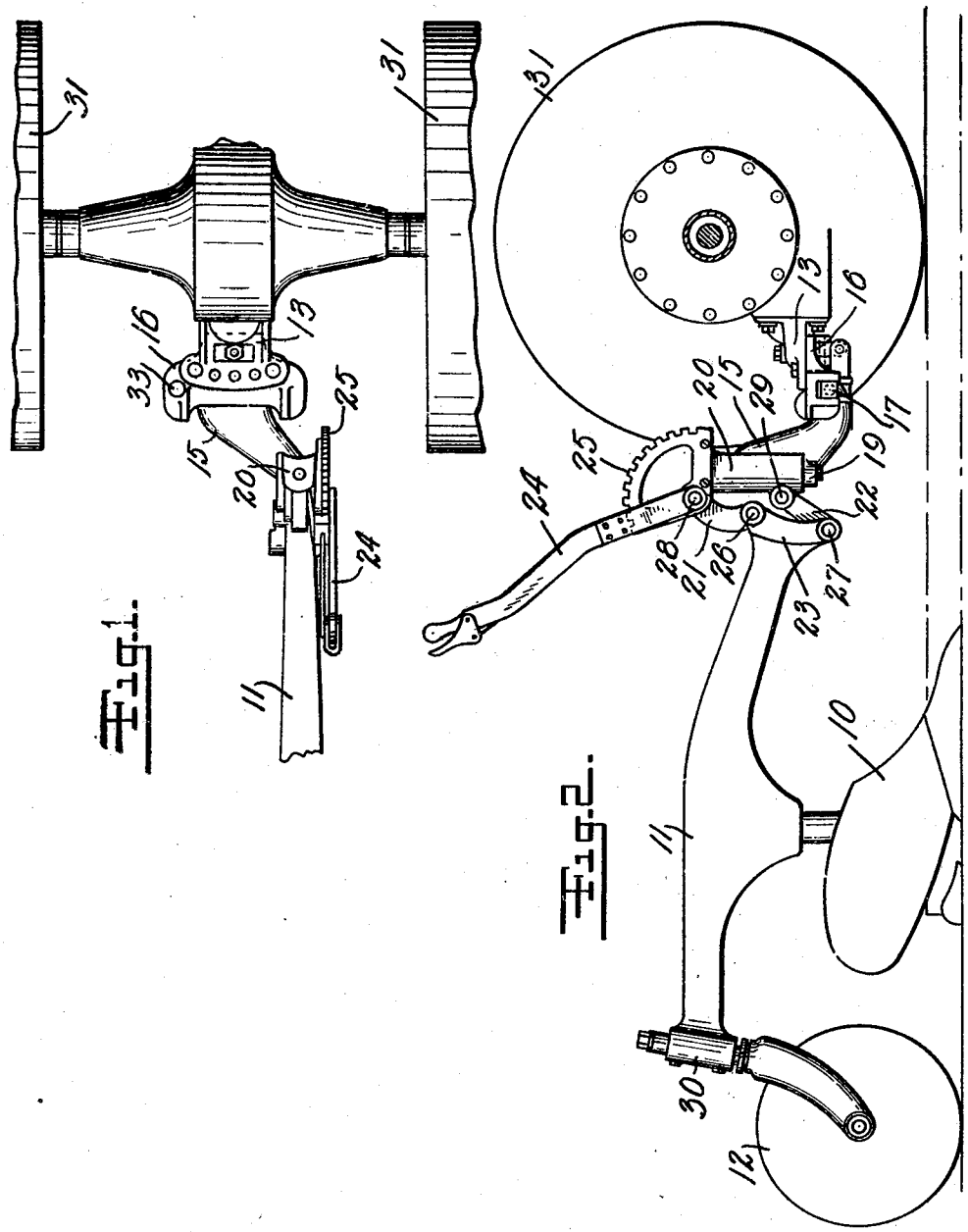
Inventor
Frank S. Shields
By his Attorney
Abel L. Brownigg Nov. 8, 1927.
F. S. SHIELDS
1,648,366
TRACTOR HITCH FOR PLOWS
Filed June 23, 1924
4 Sheets-Sheet 2
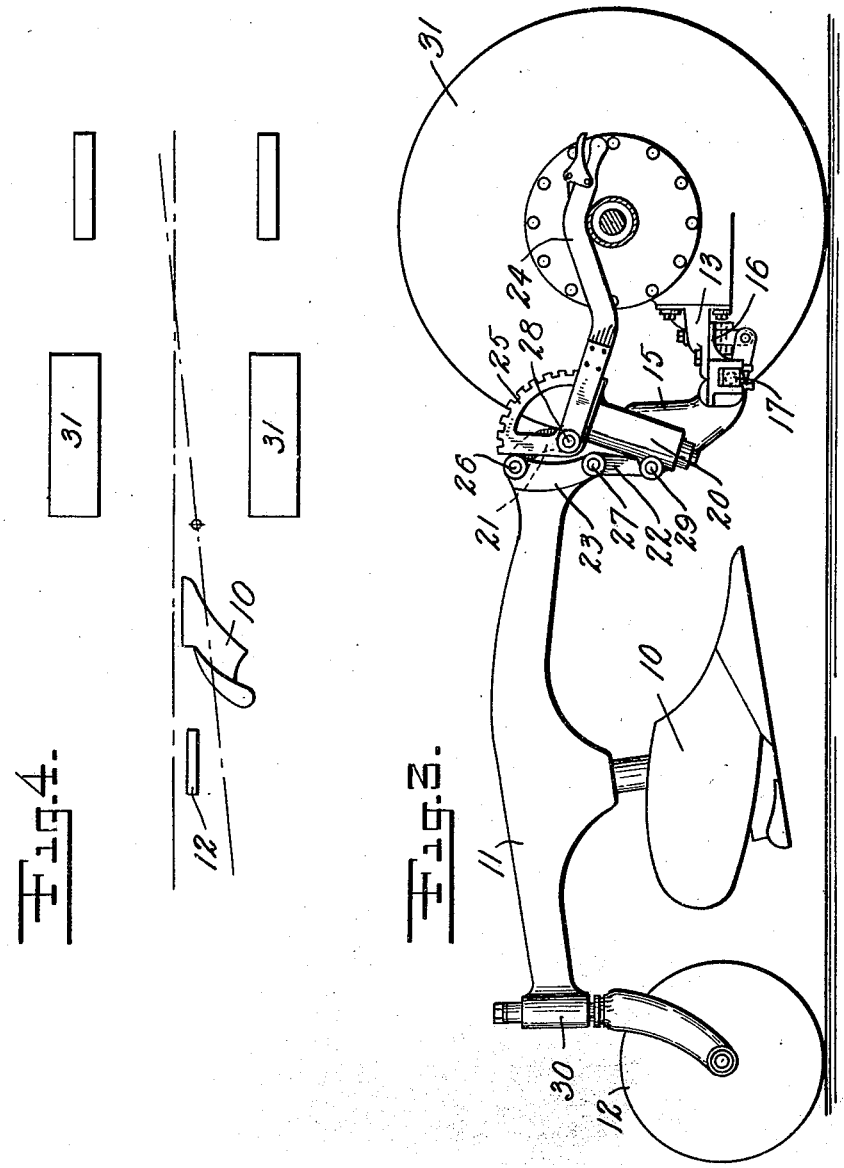
Inventor
Frank S. Shields
By his Attorney
Abel L. Browning Nov. 8, 1927. 1,648,366
F. S. SHIELDS
TRACTOR HITCH FOR PLOWS
Filed June 23, 1924 4 Sheets-Sheet 3
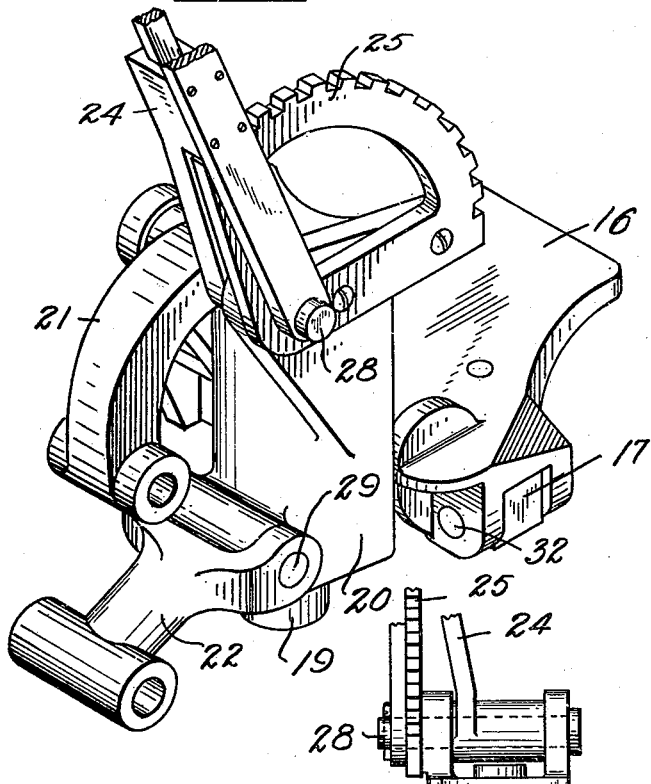
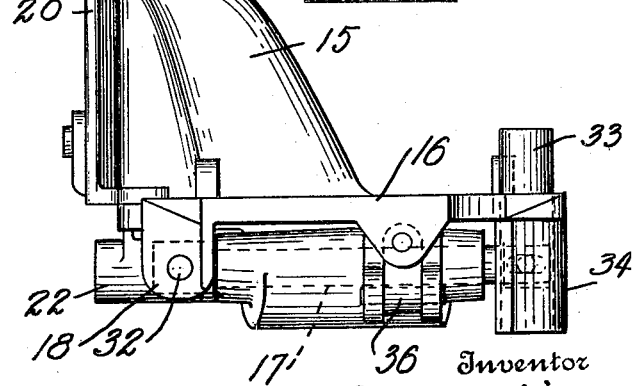
Inventor
Frank S. Shields
By his Attorney
Abel L. Browning Nov. 8, 1927.
F. S. SHIELDS
1,648,366
TRACTOR HITCH FOR PLOWS
Filed June 23, 1924   4 Sheets-Sheet 4
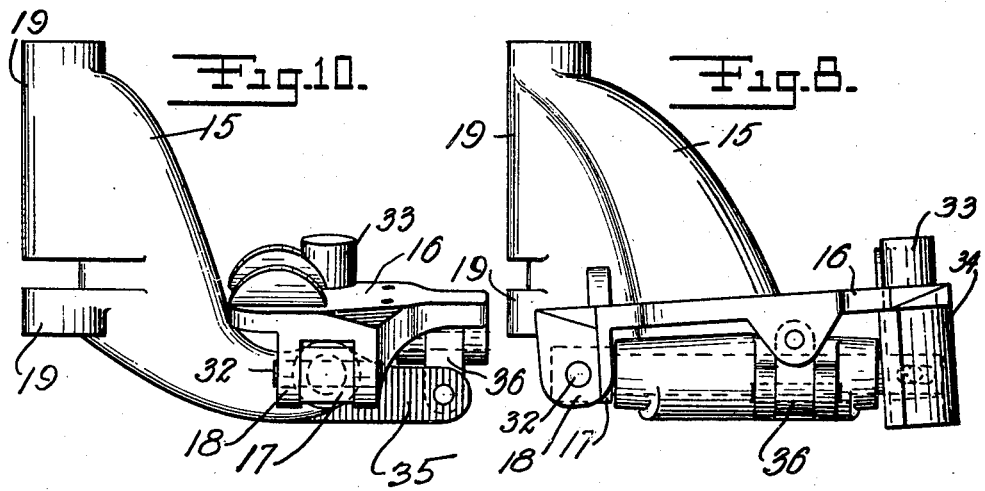
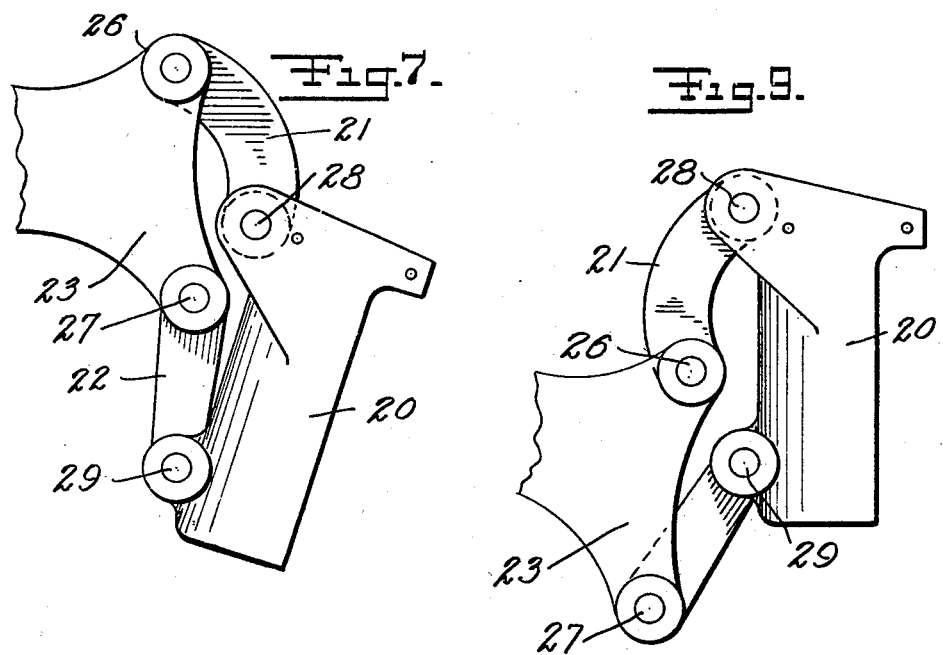
Inventor
Frank S. Shields
By his Attorney Patented Nov. 8, 1927.

1,648,366

UNITED STATES PATENT OFFICE.

FRANK S. SHIELDS, OF BROOKLYN, NEW YORK, ASSIGNOR TO THE UNIVERSAL TILLER CORPORATION, OF NEW YORK, N. Y., A CORPORATION OF DELAWARE.

TRACTOR HITCH FOR PLOWS.

Application filed June 23, 1924. Serial No. 721,658.

This invention relates generally to coupling devices and more particularly to an improved plow hitch construction for coupling a plow to a tractor of the Fordson type.

In the development of agricultural tractors of the internal combustion engine type considerable difficulty has been found in providing a satisfactory hitch that will satisfy the rigorous requirements of a mechanical coupling device of this nature.

Tractor hitches of types heretofore known have been open to various objections, a number of which will be named. Such prior devices have included complicated constructions which not only correspondingly restricted the efficiency of operation of the machine as a whole, but added unnecessarily to the cost of construction. Another objection has been the undue length of the connecting parts which spaced the plow unit so far to the rear of the tractor as to necessitate the reservation of a relatively large area of ground at the opposite ends of a field to provide for turning the machine around to reverse the direction of travel. Another objection has been an unsatisfactory distribution of load which interfered with the full effectiveness of the pull of the tractor. Another objection has resided in an inadequate provision for leveling the plow unit regardless of lateral tilting of the tractor. Still another objection resides in the lack of means for adequately controlling the plow unit in its lifted on inoperative position and particularly in a backing operation.

A general object of the present invention is to provide a tractor hitch construction which will be free from the objectionable features referred to and which will provide an improved hitch marked by simplicity of construction and a wide range of useful functions in operation.

The invention includes a construction having a minimum number of operating parts and provides for coupling the beam of the plow directly, except for a plow-supporting connection which is relatively short with respect to the type of connection formerly used, to the draw-bar of the tractor. The short-hitch construction thus obtained provides two useful functions, the apparatus can be turned around in a smaller area thereby reducing the space needed in which to turn at the end of the field, and, in addition, a larger proportion of the downward pull of the plow in operation is borne directly by the tractor and usefully employed in increasing the grip or traction of the driving wheels on the ground for the type of plow having a plow-share on a beam supported at the rear on a caster wheel.

The plow-supporting connection includes a bracket and a modified form of parallel motion device working on horizontal axes and actuated by a hand lever to control the elevation of the plow beam and to lock the beam at a maximum limit of elevation when the plow bottom is in inoperative position and lifted clear of the ground for road travel. This structural feature is so combined with a caster wheel bracket at the rear of the plow having an inclination to the vertical when the plow is in operation, that the bracket of the caster-wheel is brought to a vertical position when the plow is elevated, thereby providing for the maintenance of the plow at the same elevation from the ground in both forward or backward movement of the apparatus while the plow is in raised position.

The coupling or hitch also includes within itself provision for automatically maintaining the plow unit in a level position in operation regardless of lateral tilting of the pulling tractor. The construction is such as to also provide a vertical pivot axis in the plow-supporting connection in line with the vertical center axis of the tractor and in substantially the center of draft on the plow bottom.

Other features of the invention will be hereinafter referred to.

In the drawings, in which a preferred embodiment of the invention has been selected for illustration, Figure 1 is a plan view of a tractor hitch for plows embodying the invention.

Figure 2 is a view in side elevation of the parts shown in Figure 1 and with the plow in operating position in the ground.

Figure 3 is a view similar to Figure 2 showing the plow raised or in inoperative position.

Figure 4 is a diagrammatic view showing the relation of the plow to the center of draft of the tractor.

Figure 5 is a perspective view showing the plow raising and lowering mechanism.

Figure 6 is a view in front elevation of a plow leveling device forming part of the invention.

Figure 7 is a view in side elevation of the plow-lifting parts when the leveling device is in the position shown in Figure 6.

Figure 8 is a view similar to Figure 6 showing the plow leveling device in another condition of operation.

Figure 9 is a view similar to Figure 7 showing the position of the plow-lifting parts when the leveling mechanism is in the position shown in Figure 8.

Figure 10 is a view in side elevation of the parts shown in Figure 8.

Referring to the drawings for a more detailed description of the invention, a plow unit including a plow bottom 10, a beam 11, and a rear caster-wheel 12, is coupled at the forward end of the beam to the draw-bar head 13 of a tractor 14.

The invention hereinafter described and claimed resides in great part in the improved hitch construction used in coupling the plow-unit to the tractor. The hitch construction is of a simplified nature and includes a gooseneck bracket member 15 connected at one end to a terminal plate 16 which is adapted to be bolted directly to the lower face of the draw-bar head 13. The connection referred to is effected through a pin or rod 17 passing through lugs 18 on the plate 16 and attached to the terminal plate 16 with relation to which the pin extends in a transverse direction and in a horizontal position.

The bracket 15 is curved upwardly and toward the furrow side of the apparatus from its point of attachment with the terminal plate 16, the rearward portion 19 of the bracket having a vertical-position with relation to a vertical plane extending longitudinally of the apparatus, the portion 19 being located substantially in the line of draft between the vertical central axis of the tractor and the center of draft of the plow bottom 10. The rearward extremity 19 of the bracket 15 forms a vertical axis about which the plow unit may swing horizontally in operation to thereby center itself in the line of pull to obviate side draft and attendant difficulty in steering the tractor.

The connection between the bracket 15 and the forward end of the plow beam 11 resides in a link-supporting member 20 pivotally mounted for horizontal swinging movement on the vertical section 19 of the bracket and having upper and lower link members 21 and 22 pivotally attached at one end thereto and at the other end to the terminal portion 23 of the plow beam. The upper link member 21 has attached thereto a hand lever 24 which can be locked in any desired position along the toothed segment 25 as the lever is swung to rock the link and raise or lower the plow unit parts.

It will be seen that the link members 21 and 22 with their connecting parts form what is in effect a parallel-motion device modified by causing the distance separating the points of connection 26 and 27 of the link with the beam terminal member 23 to be less than the distance between the points 28 and 29 on the link supporting member 20. The effect of this is to bring about a condition wherein the linkage-coupling connection is locked past center when the parts are raised to their limit of elevation, thereby securing the maintenance of the parts in raised or inoperative position for road travel and at the same time removing the strain on the link members. In the elevated position of the parts shown in Figure 3 of the drawing, the self-locked position of the parts is shown. With this construction it will be seen that the joint or pivot point about which pivotal motion occurs in lifting the plow is forward of the end of the plow beam. The parallel-motion device described, provides a substantial degree of lift with a relatively short travel of the operating lever and has the added effect of providing a rigid construction from the draw-bar pivot to the rear wheel of the plow unit when the plow unit is raised to position for road travel.

Referring again to the caster wheel construction at the rear of the plow unit, the caster wheel bracket 30 is inclined forwardly from the bottom to the top when the plow is in a lowered or operating position. This inclination to the vertical is such that when the plow is lifted to inoperative position by means of the bracket and link mechanism already described, the caster bracket is moved to a vertical position as shown in Figure 3 so that, when the plow is elevated for road travel the position of the caster wheel either forward or to the rear of the bracket in corresponding rearward or forward movement of the plow unit will not result in changing the elevation of the heel of the plow from the ground. This construction accordingly renders it possible to move the plow to the rear with a facility equal to that in moving the plow forwardly.

The simple hitch construction which has been described not only provides for readily lifting the plow to the full extent necessary and for correspondingly holding the plow at the desired working depth in the ground, but the short distance that exists, by reason of the short hitch construction, between the plow bottom and the tractor draw-bar results in the transfer of a great proportion of the dead weight of the plow unit to the draw-bar 13 and thence to the tractor drive wheels 31. Not only is dead weight of the plow parts thus borne by the tractor but the component of forces resulting from a combination of rearward pull of the plow and the down pull of dead weight and plow suction is also transmitted directly to the draw-bar and thence to the drive wheels. These forces instead of being inefficiently used as in prior constructions are accordingly efficiently applied to increase the grip or traction of the tractor drive wheels on the ground thereby facilitating operation of the apparatus by preventing slipping of the tractor wheels.

Another and an important function provided by the improved hitch resides in the automatic maintaining of the plow in a level position regardless of lateral tilting of the tractor such as is occasioned by the position of the wheels on one side of the tractor in the furrow while the wheels on the other side are in a relatively higher position on the unplowed land.

Different angular positions of the plow unit and the tractor are provided for by permitting the horizontal pintle-member 17, already referred to, as forming a mechanical connection between the bracket 15 and the plate 16, to swing vertically about one end with relation to the plate 16. This is accomplished by providing a pivot or hinge connection at 32 between the end of the pintle-member nearest the path of travel of the plow and attaching the other end of the pintle member to a plunger 33 arranged to slide vertically in a guiding-cylinder 34 formed on the plate 16. It will be seen that a change in the angular position of the pintle with relation to the plate to which it is attached is accompanied by a corresponding change in the positions of the tractor and the plow-unit with relation to their angular positions about the longitudinal axis of the apparatus as a center.

In order to cause the pintle member and the bracket 15 to take angular positions compensating for angular changes in the position of the tractor and thus maintaining the level position of the plow-unit, the bracket member 15 is provided with a forward extension 35 which is connected through a link 36 with the plate 16 immediately above. With this construction angular motion imparted to the plate 16 by a lateral tilting motion of the tractor conveys motion through the link 36 to the bracket extension 35 to thereby maintain the pintle member 17 in its level or normal position parallel to the surface of the ground. In Figure 6 of the drawing the relation of parts is shown when the tractor and plow are both level and it will be seen that the pintle 17 is parallel with the overlying plate 16. In Figure 7 of the drawing is shown in side view the position of the link supporting member 20 when the forward end of the bracket 15 is parallel with the draw-bar head.

In Figure 8 of the drawing is shown the relation of parts of the leveling device when the tractor is tilted as when the right-hand driving wheel is in the furrow. In this position the hinge point 32 is depressed by the tilting motion of the tractor and the forward extension 35 of the bracket 15 is raised, since this point is on the other side of the center line x—x of the tractor. The result of this is a tendency to materially depress the rearward extension 19 of the bracket 15 but, as this is resisted by the link connection, the effect is to relatively tilt the pintle rod 17 downwardly at its free end and to tilt the rearward extension of the bracket rearwardly from the inclined position shown in Figure 2 to the vertical position shown in Figure 3. As the leverage forces are designed to cause the tilting motion of the pintle to exactly compensate for the tilting of the tractor, the total result is to maintain the pintle rod and therefore the attached plow parts in a position parallel with the surface of the ground.

It will be seen that when the plow is in lowered position, as shown in Figure 2 of the drawing, the tilted position of the pintle rod 17 and the forward end of the bracket 15 with relation to the draw-bar head results in the positioning of the rearward extension 19 of the bracket and the link supporting member 20 in a substantially vertical position which facilitates the lateral pivoting movement of the plow in finding its draft position in operation.

On the other hand in the raised position of the plow the pintle rod 17 assumes a position parallel to the draw-bar head as shown in Figure 6 of the drawing and the rearward extension 19 of the bracket and the link supporting member 20 assume a position in which the upper portions are inclined forwardly with relation to the lower portions. This position of the parts places a restriction on a free and uncontrolled swinging of the plow unit laterally such as would be undesirable in road travel of the plow while, at the same time, providing for a sufficient lateral swinging movement of the plow to follow the tractor when rounding curves or corners.

It will be seen that the diagonal or oblique direction of rocking movement which is imparted to the bracket 15 by the pivotal connection between the bracket and the supporting plate 16 partakes also of a lifting and lowering movement of the rear pivotal extremity of the bracket so that an increased lift is given to the plow beam when the hand lever is swung to its forward position to swing the links upwardly. The degree of lift is still further increased by the differential spacing of the links on the support 20 and the end 23 of the plow beam which has already been referrred to.

What I claim is:

1. In a tractor-hitch for plows, a bracket formed to be connected to the draw-bar of the tractor at one end and to support the forward end of the plow beam at the other, the plow supporting end of the bracket being in line with the center of the tractor and the center of draft of the plow, the connection between the plow beam and the bracket being the sole connection between the plow and the tractor.

2. In a tractor-hitch for plows, a bracket formed for attachment at one end to the draw-bar of a tractor, the other end of the bracket extending into a position in the line of draft between the center of the tractor and the center of resistance of the plow, and a pivotal connection between the forward end of the plow beam and the free end of the bracket, said pivotal connection formed to provide for lateral swinging movement of the plow, the connection between the plow beam and the bracket being the sole connection between the plow and the tractor.

3. In a tractor-hitch for plows, a bracket formed to be connected to the draw-bar of the tractor at one end, the other end of the bracket having a vertical position in line with the vertical central axis of the tractor and the center of draft of the plow bottom, and a pivotal connection between the vertical portion of the bracket and the forward end of the plow beam to provide for lateral swinging movement of the plow, the connection between the plow beam and the bracket being the sole connection between the plow and the tractor.

4. In a tractor-hitch for plows, a bracket formed to be connected at one end to the draw-bar of a tractor, the other end of the bracket extending into a position in the line of draft between the center of the tractor and the center of resistance of the plow, a link connection between the forward end of the plow beam and the free end of the bracket, and means for rocking the link connection to change the elevation of the plow beam with relation to the bracket.

5. In a tractor-hitch for plows, a bracket formed to be connected at one end to the draw-bar of a tractor, a set of links forming a connection between the other end of the bracket and the forward end of a plow beam, said links forming substantially a parallel-motion device, and means for swinging the links to raise or lower the beam with relation to the bracket, said links being so related to each other as to provide a locked-on-center arrangement when the plow is in raised position.

6. In a tractor-hitch for plows, a bracket formed to be attached at one end to the draw-bar of a tractor, the other end of the bracket extending into a position in the line of draft between the center of the tractor and the center of resistance of the plow, a plow supporting member pivotally mounted for horizontal swinging movement on the free end of the bracket, a link connection between the forward end of the plow beam and the supporting member, and means for rocking the link connection to change the elevation of the plow with relation to the bracket.

7. In a tractor-hitch for plows, a bracket formed to be attached at one end to the draw-bar of a tractor, the other end of the bracket extending into a position in the line of draft between the center of the tractor and the center of resistance of the plow, a plow supporting member pivotally mounted for horizontal swinging movement on the free end of the bracket, a pair of links forming a connection between the plow supporting member and the forward end of the plow beam, said links forming with the connected parts substantially a parallel motion device and means for swinging the links about the supporting member as a center to change the elevation of the plow beam with relation to the bracket, said links being so related as to provide a locked-on-center arrangement when the plow beam is in raised position.

8. In a tractor-hitch for plows, a bracket formed to be attached at one end to the draw-bar of a tractor, the other end of the bracket extending into a position in the line of draft between the center of the tractor and the center of resistance of the plow, a plow supporting connection between the free end of the bracket and the forward end of the plow beam, said connection providing for both horizontal and vertical movement of the plow beam with relation to the bracket, and means carried by the connection for adjusting the vertical position of the plow beam with relation to the bracket and locking the parts in the vertically adjusted position.

9. In a tractor-hitch for plows, a bracket formed to be attached at one end to the draw-bar of a tractor, the other end of the bracket extending into a position in the line of draft between the center of the tractor and the center of resistance of the plow, a plow supporting connection between the free end of the bracket and the forward end of the plow beam, said connection providing a universal joint to permit horizontal and vertical swinging movement of the plow beam with relation to the bracket, link members providing for the vertical movement, and a hand lever attached to one of the link members for swinging the same about the end of the bracket as a center to thereby lift the end of the plow beam with relation to the bracket.

10. In a tractor-hitch for plows, a bracket formed to be attached at one end to the draw-bar of a tractor, a plow supporting member pivoted for lateral swinging movement on the other end of the bracket, a pair of links connecting the supporting member and the forward end of the plow beam, a hand lever attached to one of the links whereby to swing the links to an elevated position about the supporting member as a fulcrum and thereby elevate the forward end of the plow beam with relation to the bracket, a caster-wheel at the rear of the plow-unit, a caster-wheel-bracket in which the caster-wheel is pivoted for horizontal swinging movement, said bracket being normally inclined to the perpendicular to an extent such that the bracket will assume a vertical position when the forward end of the plow beam is elevated, whereby the caster wheel will maintain the plow bottom at the same elevation in either forward or rearward movement of the apparatus.

11. In a device for maintaining a tractor-pulled plow in a level position, a plow supporting bracket adapted to be attached to a tractor draw-bar head and to be tilted with relation thereto about an axis parallel to the longitudinal axis of the tractor, and means operating automatically to tilt the bracket in a direction opposite to a tilted position of the head to thereby compensate for a tilted position of the tractor and maintain the plow in a level position.

12. In a device for maintaining a tractor-pulled plow in a level position, a plow supporting bracket adapted to be hinged to a tractor draw-bar head and to be tilted with relation thereto about an axis extending longitudinally of the tractor, and means connecting the bracket and the head and operating automatically to tilt the bracket in a direction opposite to a tilted position of the head to thereby automatically compensate for a tilted position of the tractor and maintain the plow in a level position.

13. In a device for maintaining a tractor-pulled plow in a level position, a plow supporting bracket adapted to be hinged to the furrow-wheel side of a tractor draw-bar head and to be tilted with relation thereto about an axis extending longitudinally of the tractor, said bracket extending beneath the draw-bar head and having a link connection therewith at a point forward of the hinged connection and at the other side of the longitudinal axis of the tractor, whereby to automatically tilt the bracket in a direction opposite to a tilted position of the head to thereby automatically compensate for a tilted position of the tractor and maintain the plow in a level position.

14. In a device for maintaining a tractor-pulled plow in a level position, a plow-supporting bracket having a horizontally extending end portion arranged to be pivotally attached at one lateral edge to the under face of a tractor draw-bar head, a forwardly extending projection on the bracket end portion having a link connection with the overlying portion of the draw-bar head and spaced laterally from the point of attachment of the bracket with the head, whereby lateral tilting of the draw-bar head will operate through the link to tilt the bracket in the opposite direction with relation to the head and thereby maintain a level position of the plow.

15. In a device for maintaining a tractor-pulled plow in a level position, a supporting member adapted to be attached to the under face of a tractor-draw-bar, a rod hinged at one end to the under face of the supporting member at the edge thereof nearest the furrow-wheel, said rod extending transversely across the under face of the supporting member and guided for vertical movement of its free end, a plow supporting bracket attached to the rod and provided with a forward extension on that side of the longitudinal axis of the tractor opposite the hinged end of the rod, a link connecting the forward extension with the overlying portion of the supporting member, and said bracket having an extension projecting rearwardly from the hinged end of the rod and having a vertical disposition for pivotal connection with the forward end of a plow beam.

16. In a tractor-hitch for plows, a bracket formed to be attached at one end to the draw-bar of a tractor and hinged for vertical swinging movement thereon about a transverse axis, the other end of the bracket forming a pivot about which the plow has lateral swinging movement, and means for adjusting the pivot end of the bracket to a vertical position to provide for lateral movement of the plow in operation and for adjusting the bracket to move the pivot end to a forwardly inclined position when the plow is elevated for road travel to thereby restrict lateral swinging movement of the plow.

17. In a tractor-hitch for plows, a bracket formed to be attached at one end to the draw-bar of a tractor and hinged for vertical swinging movement thereon about combined longitudinal and transverse axes, the other end of the bracket forming a pivot about which the plow has lateral swinging movement, a pair of links one above the other connecting the beam of the plow with the pivot end of the bracket, and means for swinging the links through a vertical plane to raise or lower the plow beam and to adjust the position of the bracket whereby the pivot end of the bracket will have a vertical position when the plow is lowered to operating position to provide for lateral movement of the plow and will have a forwardly inclined position when the plow is elevated whereby to restrict the lateral swinging movement of the plow in road travel.

18. In a device for maintaining a plow in level position in operation, a plow pull member, a plow supporting bracket adapted to be attached to the plow pull member, and means for tilting the bracket with relation to the pull member vertically about an axis extending obliquely to the longitudinal and transverse axes of the pull member.

19. In a tractor-hitch for plows, a bracket formed to be attached at one end to the draw-bar of a tractor, the other end of the bracket extending upwardly and laterally into a position in the line of draft between the center of the tractor and the center of resistance of the plow, a member pivotally mounted for horizontal swinging movement on the free end of the bracket, a pair of links mounted one above the other connecting the pivotally mounted member and the forward end of the plow beam, the distance separating the points of connection of the links with the plow beam being less than the distance separating the points of connection with the pivotally mounted member, and a lever for swinging the links about their points of connection with the pivotally mounted member to raise or lower the plow.

FRANK S. SHIELDS.